United States Patent [19]
Karcher

[11] 3,748,509
[45] July 24, 1973

[54] VEHICLE POWER SUPPLY ARRANGEMENT WITH DISCRETE RECTIFIER UNIT

[75] Inventor: Walter Karcher, Hemmingen, Germany

[73] Assignee: Robert Bosch GmbH, Stuttgart, Germany

[22] Filed: Jan. 12, 1972

[21] Appl. No.: 217,194

[30] Foreign Application Priority Data
Jan. 13, 1971   Germany.................. P 21 01 267.9

[52] U.S. Cl. ................................. 310/68 D, 310/62
[51] Int. Cl. ........................................... H02k 11/00
[58] Field of Search ..................... 310/68, 68 D, 52, 310/53, 55, 58, 62, 63

[56] References Cited
UNITED STATES PATENTS
3,041,484   6/1962   Freer ................................ 310/68 D
3,356,873  12/1967   Tamm ................................... 310/52
3,198,972   8/1965   Larson .................................. 310/68
3,001,121   9/1961   Kerr..................................... 310/68 D
3,461,331   8/1969   Pannell ................................ 310/68
2,897,383   7/1959   Barrows ............................. 310/68 D FOREIGN PATENTS OR APPLICATIONS
1,098,185   1/1968   Great Britain .................... 310/68 D Primary Examiner—R. Skudy
Attorney—Michael S. Striker

[57] ABSTRACT

An alternator includes a housing, and a rectifier unit for the electrical users and a battery of the vehicle is constructed as a separate entity, having a casing with the rectifying circuit and the rectifiers of the circuit all mounted in the casing, and with the casing being releasably secured to the axial end of the alternator. On the output shaft of the alternator a separate impeller is mounted which extends into the rectifier unit and cools the same.

16 Claims, 2 Drawing Figures

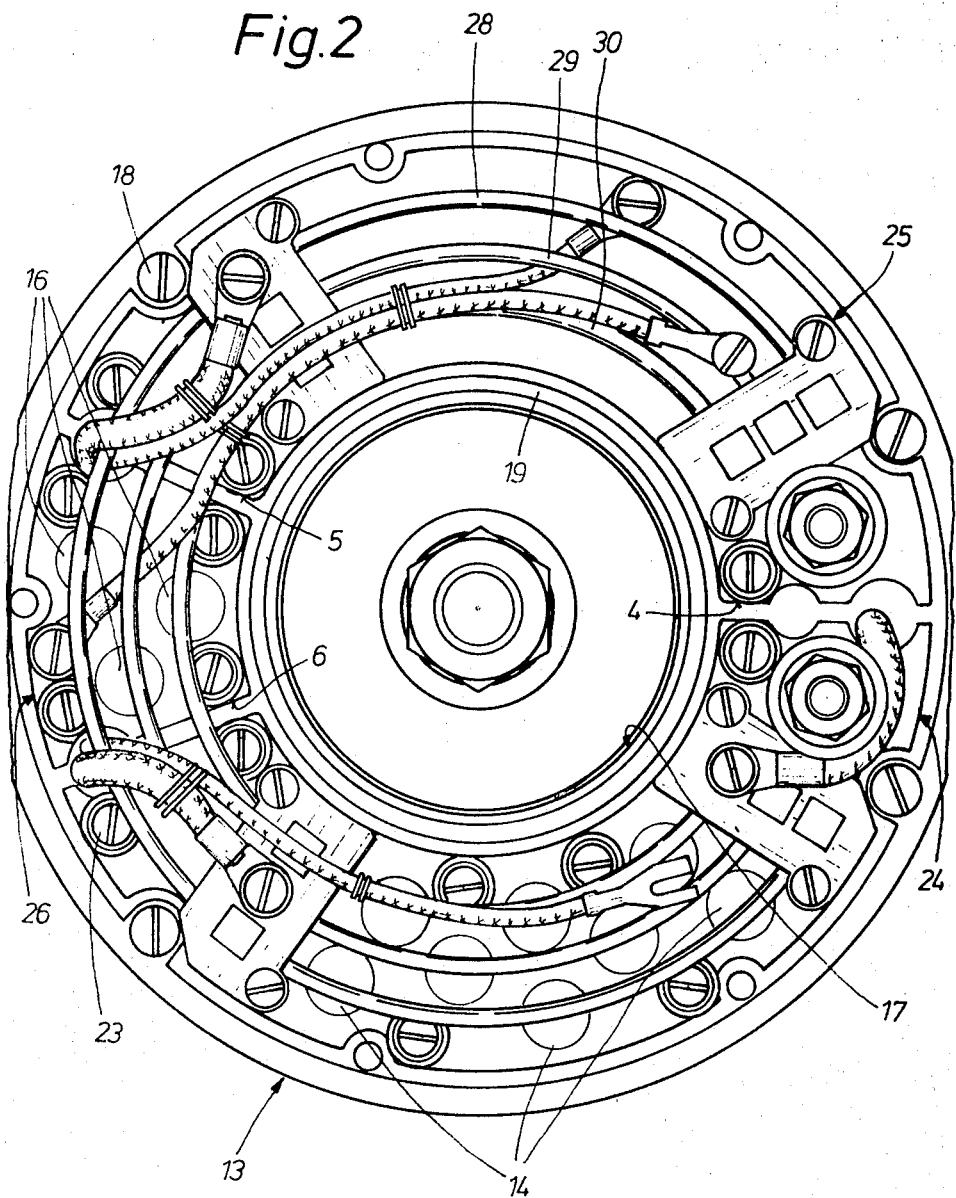

VEHICLE POWER SUPPLY ARRANGEMENT WITH DISCRETE RECTIFIER UNIT

BACKGROUND OF THE INVENTION

The present invention relates generally to power supply arrangements, and more particularly to power supply arrangements for use in vehicles, such as motor vehicles and the like.

Power supply arrangements of this type, for example those used in motor vehicles, are subjected to ever and ever greater demands because of the constantly increasing power requirements in modern vehicles. This arises from the fact that modern vehicles now have many power-operated accessories, for instance electric windows, electric seats, various auxiliary lights and the like. It is of course no problem to construct the power supply arrangements in such a manner that they can meet the power requirements, but difficulties have been encountered in cooling these arrangements. Such power supply arrangements include a generator and a rectifier circuit, and they can be cooled either with a liquid or with air. Liquid cooling is efficient but expensive because of the relative structural complexity required for such an installation. As a rule the necessary expenses are not warranted or feasible, and therefore cooling is usually effected by radiation of heat to the air. It is known from the art to install the power diodes of the rectifying circuit in the housing of the generator, so that heat is transmitted from the dioes to the generator housing whose surface is exposed to the air and thus serves to radiate the heat, that is the housing of the rectifier acts as a heat sink. The problem with this solution is that the generator itself produces heat which must be dissipated and which may arise to such levels that additional heating of the generator housing due to heat developed by the recitfier circuit itself is not acceptable. Furthermore, the arrangement just mentioned makes it difficult to gain access to the rectifying circuit for replacing components thereof if and when necessary.

SUMMARY OF THE INVENTION

The present invention therefore has as its general object to overcome the disadvantages of the prior art.

More particularly it is an object of the invention to provide such a power supply arrangement in which the rectifier circuit itself is distinct and independent from the generator to the maximum possible extent, insofar as thermal considerations are concerned.

Another object of the invention is to provide such a power supply arrangement in which, despite the thermal independence of the rectifying circuit, the mechanical connection of the same with the generator is such that the number and dimensions of the necessary mechanical and electrical connectors, as well as the structural requirements for cooling of the rectifying circuit, are reduced to a minimum.

In pursuance of these and other objects which will become apparent hereafter one feature of the invention resides in a power supply arrangement, particularly for use in vehicles, which briefly stated comprises the combination of an alternator including the housing which has an axial end, and a separate rectifier unit including a casing and a rectifying circuit operatively associated with the alternator and comprising a plurality of rectifiers all of which are mounted in the casing. Connecting means connects the rectifier unit to the housing at the axial end thereof, and cooling means is provided for cooling the rectifier unit.

The casing of the rectifier unit is of a material which has good thermal conductivity, usually metal, and it has an air inlet and an air outlet for cooling air. A substantial increase in the surface area of the casing from which heat can be dissipated is achieved if at least in the region of the air outlet the casing is provided with cooling fins, and on the other hand if the open side of the casing which faces away from the axial end of the alternator housing, and where the air inlet for the cooling air is located, is completely closed by a metallic cover except for the air inlet. The metallic cover, which is in thermally conductive engagement with the remainder of the casing, thus also serves for heat dissipating purposes. At the same time it provides excellent protection for the rectifying circuit, including the various rectifiers mounted in the casing, against mechanical damage, dirt, and moisture. The provision of the cover has a further advantage which is of considerable importance, namely the fact that it protects mechanics or other personnel working on or in the vicinity of the power supply arrangement against contact with the rectifying circuit and thus against shocks. This is achieved in that according to the invention the entire rectifier unit is so constructed that its entire exposed surface is protected against carrying any electrical potential, and that no components carrying such a potential are accessible at the exterior of the casing. In a particularly simple way this can be achieved in that the rectifiers of the circuit are mounted on at least two heatsinks which are insulated electrically from one another and from the casing of the unit by the interposition of a polyester layer, for instance of the type which is commercially available under the tradename "Hostaphan." The mounting of the heatsinks to the casing, that is on the interior of the same, is effected by means of screws or bolts which extend through the heat-sinks but in electrically insulated relationship therefrom.

It is advantageous in terms of the overall construction of the power supply arrangement if the casing of the rectifier unit is of circular cross-section and if its outer diameter corresponds—to the extent possible—to the outer diameter of the generator or alternator housing. The air inlet opening for the casing should be centrally located, preferably circular and be coaxial with the output shaft of the alternator when the casing is mounted on the housing of the alternator, and the cooling means is advantageously in form of an impeller which is mounted on the output shaft in such a manner as to extend into the interior of the casing. The rectifier unit is preferably mounted at the axial end of the alternator housing which is axially spaced from the input end of the alternator and it is advantageously constructed as an aluminum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view of the embodiment in FIG. 1 as seen in the direction of the arrow II of that Figure, with the cover of the rectifier unit removed for clarity.

DESCRIPTION OF THE PREFERRED EMBODIMENTS

Figure 1:
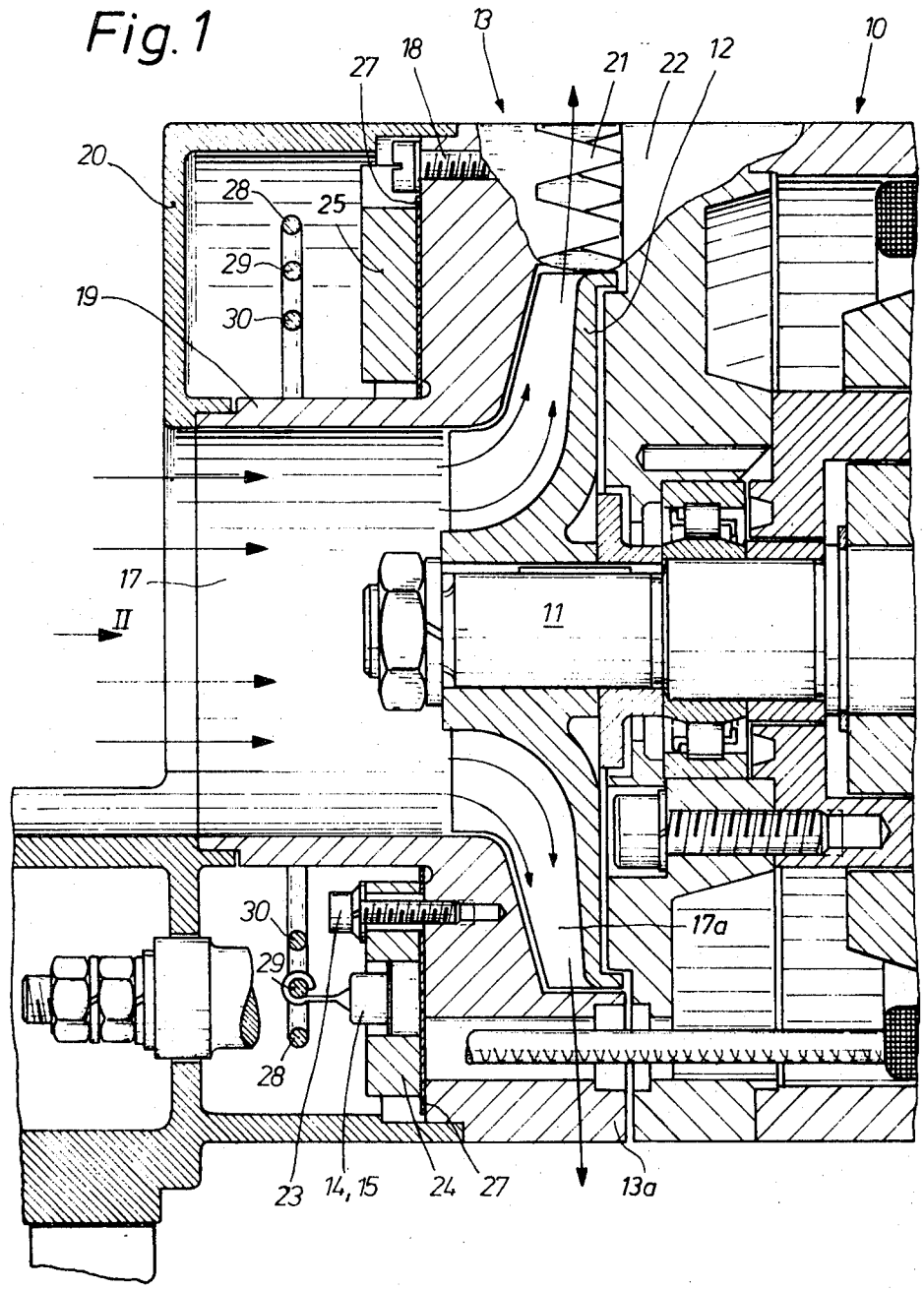
FIG. 1 is a fragmentary axial section through a power supply arrangement according to an embodiment of the invention.

It will be seen that in the illustrated embodiment the alternator 10 is a brushless three phase alternating current generator, but it should be understood that the invention is equally applicable with any type of alternator. The alternator 10 illustrated in the drawing has an output shaft 11 an end portion of which projects beyond one axial end of the alternator housing, it being understood that this is the axial end which is remote from the input side of the alternator, that is the side where the alternator is driven. Mounted on this free end portion of the output shaft 11 is a turbine-type impeller 12 which is advantageously an aluminum casting and which, in accordance with considerations known per se, is so constructed that its blades will impel air irrespective of the direction in which the impeller 12 is rotated. No attempt has been made to show how the alternator itself is cooled, and it should be understood that the purpose of the impeller 12 is only the cooling of the separate rectifier unit 13 which is mounted on the axial end of the housing of the alternator 10.

The rectifier unit is identified, as already indicated, with reference numeral 13 and has a casing 13a of metallic material and in this embodiment of circular cross-section. The casing 13a is advantageously also an aluminum casting and has a centrally located circular air inlet passage 17 which, when the casing 13a is connected to the axial end of the housing of the alternator 10 by means of screws 18, is coaxial with respect to the alternator output shaft 11. The tubular portion 19 of the casing 13a in effect provides an air inlet duct through which air is drawn by rotation of the impeller 12, as indicated by the straight arrow, to be expelled as indicated by the curved arrows through the air outlet opening 17a. To increase the heat dissipating surface area of the casing 13a the latter is provided in the region of the air outlet opening 17a with cooling fins 21.

The entire components of the rectifying circuit are located in the casing 13a and mounted therein. This includes the positive power rectifiers 14 as well as the negative power rectifiers 14, and also the energizing diodes 16. To protect the circuit components against mechanical damage, moisture and dirt, as well as to prevent inadvertent contact with them by mechanics or other personnel, and in order to provide a further increase of the heat dissipating surface area of the unit 13, a cover 20 is provided which advantageously is also an aluminum casting and which is suitably secured to the casing 13a, leaving the air inlet opening 17 uncovered. In this connection it is pointed out that if desired or necessary the alternator 10 itself may receive some cooling benefit from the cooling arrangement for the rectifier unit by having its bearing plate 22 also provided with cooling fins extending into the stream of cooling air impelled by the impeller 12.

Mounted in the casing 13a by means of screws 23 are three heatsinks 24, 25 and 26. The positive power rectifiers 14 are mounted on the heatsink 24, the negative power rectifiers 15 on the heatsink 25 and the energizing diodes 16 are mounted on the heatsink 26. The heatsinks themselves are separated and electrically insulated from one another by small air gaps 4, 5 and 6 (see FIG. 2) and are electrically insulated with respect to the casing 13a by an interposed polyester foil 27, for instance of the type which is available commercially under the tradename "Hostaphan." The screws 23 of course extend in insulated relationship through the heatsinks 24, 25 and 26 to connect them with the casing 13, and thus the casing 13a is completely free of any electric potential to eliminate all possibility of a shock to persons touching it.

As the drawing shows, particularly FIG. 1, the rectifiers 14, 15 and 16 are press fitted in recesses provided for this purpose in the respective heatsinks 24, 25 and 26; the positive or negative electrode of the respective rectifiers is in electrically conductive contact with the respectively associated heatsink and the respectively other electrode—in accordance with the electric circuit diagram which is not shown because it is of no importance for the invention and is conventional and thus known per se—is in electrically conductive relationship with busbars 28, 29 and 30 which in turn are connected with the output windings of the alternator 10.

As FIG. 2 shows all of the heatsinks 24, 25 and 26 are configured as segments of a circle. Because of the higher heat output of the power rectifiers 14 and 15 the included angle of the segment-shaped heatsinks 24 and 25 is approximately 150°, whereas the included angle of the segment-shaped heatsink 26 is only approximately 60° because of the lesser amount of heat to be dissipated.

The massive, large configuration of the heatsinks 24, 25 and 26 makes it possible that the connecting bolts of the alternator—which are often subject to substantial mechanical stresses—need no longer be secured in insulated relationship in the bearing plate of the alternator, as was heretofore customary, but instead can be directly connected with the heatsinks themselves as indicated by the bolts or screws 18 (see especially FIG. 1). This is important because the insulation of these bolts was frequently damaged in the prior-art constructions, leading to shorting of the system.

It is worthwhile to mention an additional advantage of the present invention besides those which have already been outlined above, namely the fact that the construction of the rectifier unit as a completely separate unit which can be connected to and disconnected from the alternator 10 at will and in toto, makes the rectifier unit highly versatile in its applications. Evidently, the necessary number of different types of such units can be reduced and the heretofore substantial stocking requirements—arising from the fact that many different types of rectifier systems had to be kept on hand—is substantially reduced. The rectifier unit can be used in conjunction with air cooled as well as with liquid cooled generators or alternators and, although corresponding outer diameters of the generator housing and of the rectifier unit casing are usually desirable, this is not absolutely necessary so that, if the heat to be dissipated so permits, it is certainly possible to combine for instance a rectifier unit of smaller outer diameter with a generator or alternator of larger outer diameter.

It will be understood that each of the elements described above, or two or more together, may also find a useful application in other types of constructions differing from the types described above.

While the invention has been illustrated and described as embodied in a power supply arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In a power supply arrangement, particularly for use in vehicles, in combination, an alternator including a housing which has an axial end; a separate rectifier unit including a casing having an outlet for cooling air , cooling fins in the region of said outlet, and a rectifying circuit operatively associated with said alternator and comprising a plurality of rectifiers all of which are mounted in said casing; connecting means for connecting said rectifier unit to said housing at said axial end thereof; and cooling means for cooling said rectifier unit.

2. In a power supply as defined in claim 1, wherein said alternator is a shunt-wound three-phase alternating-current generator.

3. In a power supply as defined in claim 1, wherein said casing is of metallic material.

4. In a power supply as defined in claim 1, wherein said cooling means in an impeller.

5. In a power supply as defined in claim 4, said alternator having an output shaft including an end-portion which extends beyond said axial end; and wherein said impeller is mounted on said endportion for rotation therewith and is at least in part located in said casing.

6. In a power supply as defined in claim 5, wherein said casing is of substantially circular cross-section and provided with a central substantially circular cooling-air passage which is coaxial with said shaft when said unit is connected to said housing.

7. In a power supply as defined in claim 1, said alternator having an input side, and wherein said axial end is axially spaced from said input side.

8. In a power supply as defined in claim 1, said unit having an exposed side facing away from said alternator, and said casing including a metallic cover completely covering said exposed side.

9. In a power supply as defined in claim 1, wherein said casing is an aluminum casting.

10. In a power supply as defined in claim 4, wherein said impeller is a turbine rotor.

11. In a power supply as defined in claim 4, wherein said impeller is a turbine rotor configurated so as to impel cooling air in any direction of rotation.

12. In a power supply arrangement, particularly for vehicles, in combination an alternator including a housing which has an axial end;
a discrete rectifier unit including a casing of metallic material, a rectifying circuit operatively associated with said alternator and comprising a plurality of rectifiers all of which are mounted in said casing, at least two heat sink elements on which said rectifiers are mounted, and electrically insulating means insulating said elements from one another and from said casing;
connecting means connecting said rectifier unit to said housing at said axial end thereof; and
cooling means for cooling said rectifier unit.

13. In a power supply as defined in claim 12, said electrically insulating means comprising a layer of electrically insulating polyester interposed between said casing and said elements; and further comprising mounting screws mounting said elements on said casing in electrically insulated relationship.

14. In a power supply as defined in claim 12, said rectifiers including positive rectifiers mounted on one of said elements, and negative rectifiers mounted on the other of said elements.

15. In a power supply as defined in claim 14, wherein said one and said other element each are configurated as segments of a circle having included angles of substantially 150° of arc.

16. In a power supply as defined in claim 12, wherein said alternator is a shunt-wound three-phase alternating-current generator; said rectifiers including energizing diodes for the shunt-winding of said generator and mounted on one of said elements, and wherein said one element is configurated as a segment of a circle and has an included angle of substantially 60° of arc.

* * * * *